(12) United States Patent
Pickens

(10) Patent No.: US 7,720,649 B2
(45) Date of Patent: May 18, 2010

(54) REVERSE ENGINEERING METHOD FOR DISK AND BLADE ATTACHMENTS

(75) Inventor: John T. Pickens, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 590 days.

(21) Appl. No.: 11/726,019

(22) Filed: Mar. 20, 2007

(65) Prior Publication Data

US 2008/0229579 A1   Sep. 25, 2008

(51) Int. Cl.
*G06F 17/50*   (2006.01)

(52) U.S. Cl. .......................................................... 703/1

(58) Field of Classification Search ....................... 703/1
See application file for complete search history.

(56) References Cited

U.S. PATENT DOCUMENTS

| | | | |
|---|---|---|---|
| 3,932,923 | A | 1/1976 | DiMatteo |
| 4,613,234 | A | 9/1986 | Cruickshank |
| 4,995,087 | A | 2/1991 | Rebello et al. |
| 5,552,992 | A * | 9/1996 | Hunter ........................ 700/118 |
| 6,091,999 | A | 7/2000 | Crump et al. |
| 6,708,071 | B1 | 3/2004 | Turner |
| 6,886,422 | B2 | 5/2005 | King et al. |
| 6,912,446 | B2 | 6/2005 | Wang et al. |
| 7,014,424 | B2 | 3/2006 | Cunha et al. |
| 7,015,473 | B2 | 3/2006 | Harding et al. |
| 7,024,032 | B2 | 4/2006 | Kidd et al. |
| 7,317,992 | B2 * | 1/2008 | Fascinato et al. .............. 702/34 |

FOREIGN PATENT DOCUMENTS

EP    1 457 853 A1    9/2004

OTHER PUBLICATIONS

Yongqing Li et al., "An Engineering Rules based Parameterization Approach for Turbine Blade Reverse Engineering", 2004, Proceedings of the Geometric Modeling and Processing, eight unnumbered pages.*

Shang-Liang Chen et al., "Computer aided manufacturing technologies for centrifugal compressor impellers", 2001, Journal of Materials Processing Technology, vol. 115, pp. 284-293.*

(Continued)

*Primary Examiner*—Paul L Rodriguez
*Assistant Examiner*—Russ Guill
(74) *Attorney, Agent, or Firm*—Kinney & Lange, P.A.

(57) ABSTRACT

A method of reverse engineering a component of a gas turbine engine having a root attachment feature includes scanning the root attachment feature a plurality of times to obtain raw scan data, creating a best fit line relative to pressure faces of the root attachment feature as a function of the raw scan data, determining a pressure face angle as a function of the relationship between the best fit lines of the pressure faces, bisecting the pressure face angle to determine a symmetry plane for the root attachment feature, establishing a master attachment data set in relation to the local coordinate system by averaging the best fit lines and the raw scan data for each scan of the root attachment feature, and verifying symmetry of the master attachment data set.

21 Claims, 10 Drawing Sheets

OTHER PUBLICATIONS

Liang-Chia Chen et al., "Reverse engineering in the design of turbine blades—a case study in applying the MAMDP", 2000, Robotics and Computer Integrated Manufacturing, vol. 16, pp. 161-167.*

Metris, "Reverse Engineering of Turbine Blades", Aug. 2004, retrieved from the internet at http://www.metris.com/industries/application_case_studies/coordinate_measuring_machines/qinetiq/, two unnumbered pages.*

Yunfeng Liu et al., "Study on reverse modeling of turbine blade based on fbre method", Jan. 2006, Proceedings of the International conference on advanced design and manufacture, six unnumbered pages.*

"About Us," Geomagic, Inc., www.geomagic.com/en/about_us/ (visited Dec. 20, 2006).

* cited by examiner

REVERSE ENGINEERING METHOD FOR DISK AND BLADE ATTACHMENTS

BACKGROUND OF THE INVENTION

The present invention relates to methods of reverse engineering gas turbine engine components, and more particularly to reverse engineering gas turbine engine components having blade root attachment features.

Over the life of a gas turbine engine, numerous engine components will become worn or damaged and require repair or replacement. This is particularly true for so-called life-limited parts. In some situations, wear or damage to a particular component may be beyond repairable limits, making replacement necessary. This is frequently the case for turbine blades and rotor disks to which those blades are secured.

In situations where original design specifications or blueprints are unavailable, it is necessary to reverse engineer existing components in order to fabricate replacement components. The reverse engineering of gas turbine engine components such as turbine blades and rotor disks presents a number of unique problems. For example, turbine blades typically include a shaped root portion (e.g., a firtree, dovetail, or otherwise shaped root) that is secured within a correspondingly shaped slot in a rim of a rotor disk, and these features can be collectively referred to as root attachment features. These root attachment features provide precise engagement surfaces and shapes, and the tolerances of such features can be difficult to determine. Moreover, gas turbine engine components are often extremely expensive to purchase or fabricate, which limits the number of parts that can be analyzed for comparative purposes during reverse engineering. In addition, gas turbine engine components for aerospace applications are generally subject to stringent government regulation, placing great demands on reverse engineering processes to produce replacement components that satisfy the applicable laws and regulations in order to obtain approval for use in service.

BRIEF SUMMARY OF THE INVENTION

A method of reverse engineering a component of a gas turbine engine having a root attachment feature includes scanning the root attachment feature a plurality of times to obtain raw scan data, creating a best fit line relative to pressure faces of the root attachment feature as a function of the raw scan data, determining a pressure face angle as a function of the relationship between the best fit lines of the pressure faces, bisecting the pressure face angle to determine a symmetry plane for the root attachment feature, establishing a master attachment data set in relation to the local coordinate system by averaging the best fit lines and the raw scan data for each scan of the root attachment feature, and verifying symmetry of the master attachment data set.

DETAILED DESCRIPTION

The present invention provides a method for reverse engineering gas turbine engine components having root attachment features, in order to produce a blueprint used to manufacture new replacement components. As used herein, the term "root attachment feature" refers generally to structures that help provide an engagement between a blade and a rotor disk, and can refer to structures of either the blade or the rotor disk. The method of the present invention addresses a number of unique problems posed when attempting to reverse engineer gas turbine engine components having root attachment features.

The reverse engineering process according to the present invention begins by selecting a component desired to be reverse engineered. Components for gas turbine engines are often relatively expensive. Consequently, it may only be feasible to obtain a limited number of existing components to analyze for purposes of reverse engineering. The present method accounts for the potential lack of large numbers of sample components for comparative purposes.

Once a suitable existing component has been selected for analysis, the next step is to obtain raw data regarding the geometry of the component. This raw data can be obtained using a number of different known methods using known equipment, such as advanced topographical optical scan (ATOS) equipment and coordinate measuring machines (CMMs). It may be desirable in some situations to use multiple methods of raw data collection to obtain multiple raw data sets. For instance, ATOS raw data can be collected in order to produce a digital solid body (or parasolid) representation of the component being analyzed, and CMM raw data can be collected separately for other purposes, or vice-versa.

Figure 1:
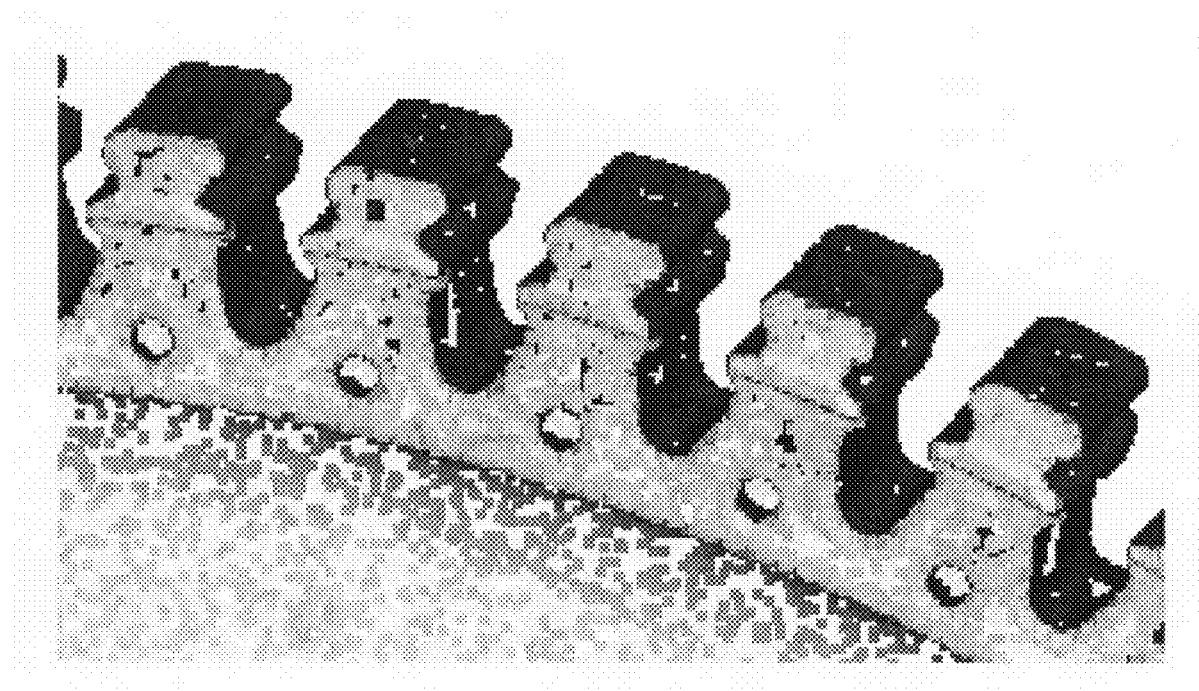
FIG. 1 is advanced topographical optical scan data of a portion of a rotor disk shown in perspective.

FIG. 1 is ATOS data of a portion of a rotor disk 20 for a gas turbine engine shown in perspective. ATOS data acquisition involves applying a paint to the component being analyzed and then scanning the painted component using optical imaging equipment that produces a digital output representing the component in a coordinate space, a visual representation of which can be color-coded in order to display topographical characteristics. For relatively large components, it is frequently impossible to image an entire component in either a single or a small number of images. This means that a number of different ATOS images must be collected and stitched together in a conventional fashion. However, it has been found that stitching ATOS data together to provide a composite image can produce errors in the digital output, and therefore the digital ATOS output is generally not suitable for direct use as a blueprint for fabricating new replacement components having root attachment features. That is, the raw data obtained through preliminary scans may be unreliable or insufficiently precise because the tolerances of gas turbine engine components, especially for root attachment features, can be exacting. The digital output from the ATOS equipment can, however, be used to produce a digital solid-body representation of the scanned rotor disk 20 that is useful for later steps of the reverse engineering process, especially when combined with data from other sources.

Raw data can also be obtained using a CMM that uses a calibrated probe to obtain raw coordinate point data along the surface of a component. The particular method of collecting the raw coordinate point data will vary according to the particular CMM used, as will be understood by those skilled in the art. For instance, some CMMs obtain coordinate data continuously along line scan paths, while other CMMs obtain coordinate data only at discrete points along scan line paths. Although generally less prone to error than ATOS raw data, CMM raw data can include errors and is generally not suitable for direct use as a blueprint for fabricating new replacement components having root attachment features.

Figure 2:
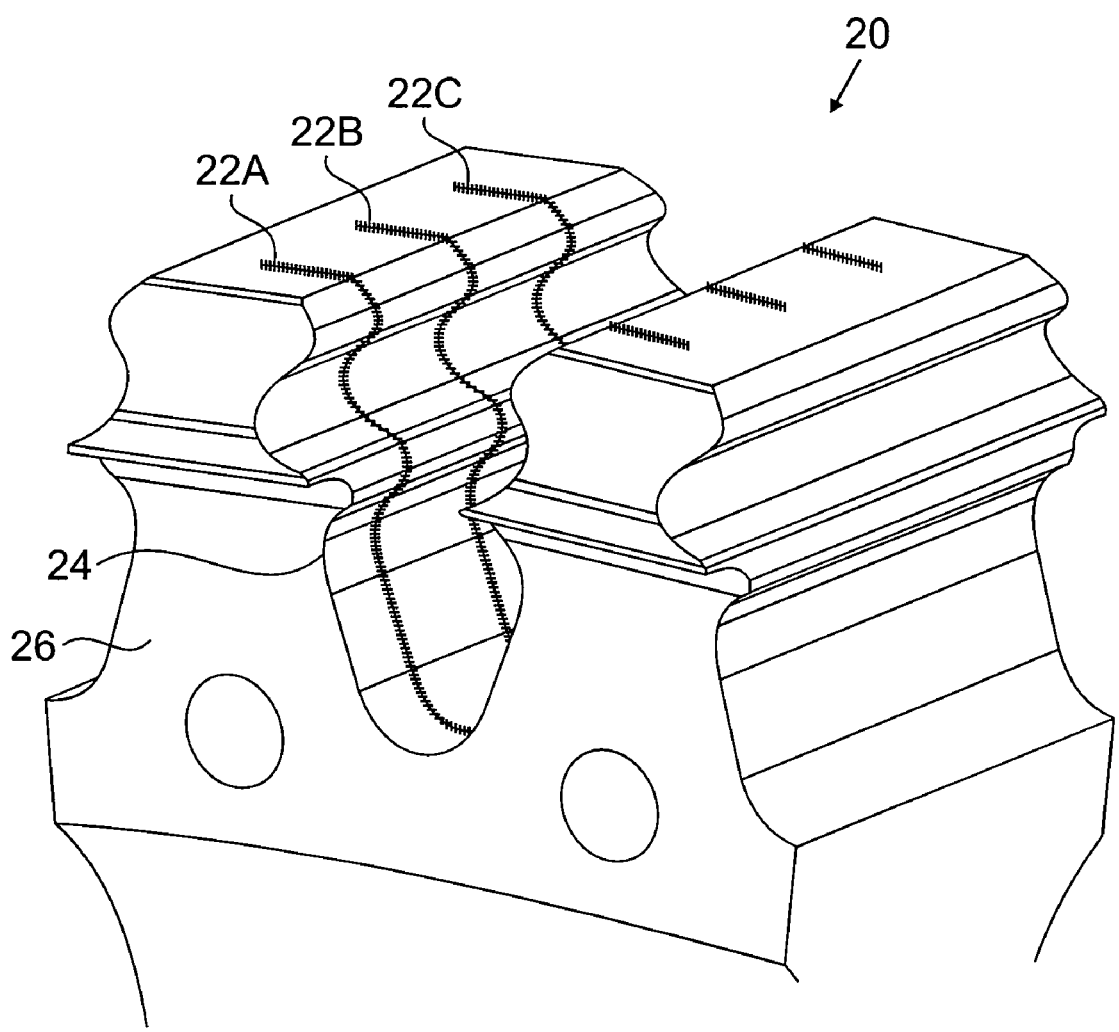
FIG. 2 is a perspective view of a portion of the rotor disk illustrating a number of line scan paths along the rotor disk.

FIG. 2 is a perspective view of a portion of the rotor disk 20 illustrating three line scan paths 22A-22C defined at a blade attachment slot 24 formed in a rim 26 of the disk 20. The line scan paths 22A-22C define paths on surfaces of the slot 24 along which a CMM probe is moved to obtain raw coordinate data, and those paths 22A-22C are selected to obtain data representative of the geometry of the slot 24. The line scan path 22B is defined in a stacking plane of the rotor 20 (which is generally located at an axial midpoint of an axial attachment slot), and the line scan paths 22A and 22C are defined in planes that are parallel to the stacking plane. The line scan path 22A is defined in a first plane that is spaced axially forward of the stacking plane, and the line scan path 22C is defined in a second plane that is spaced axially aft of the stacking plane.

Figure 3:
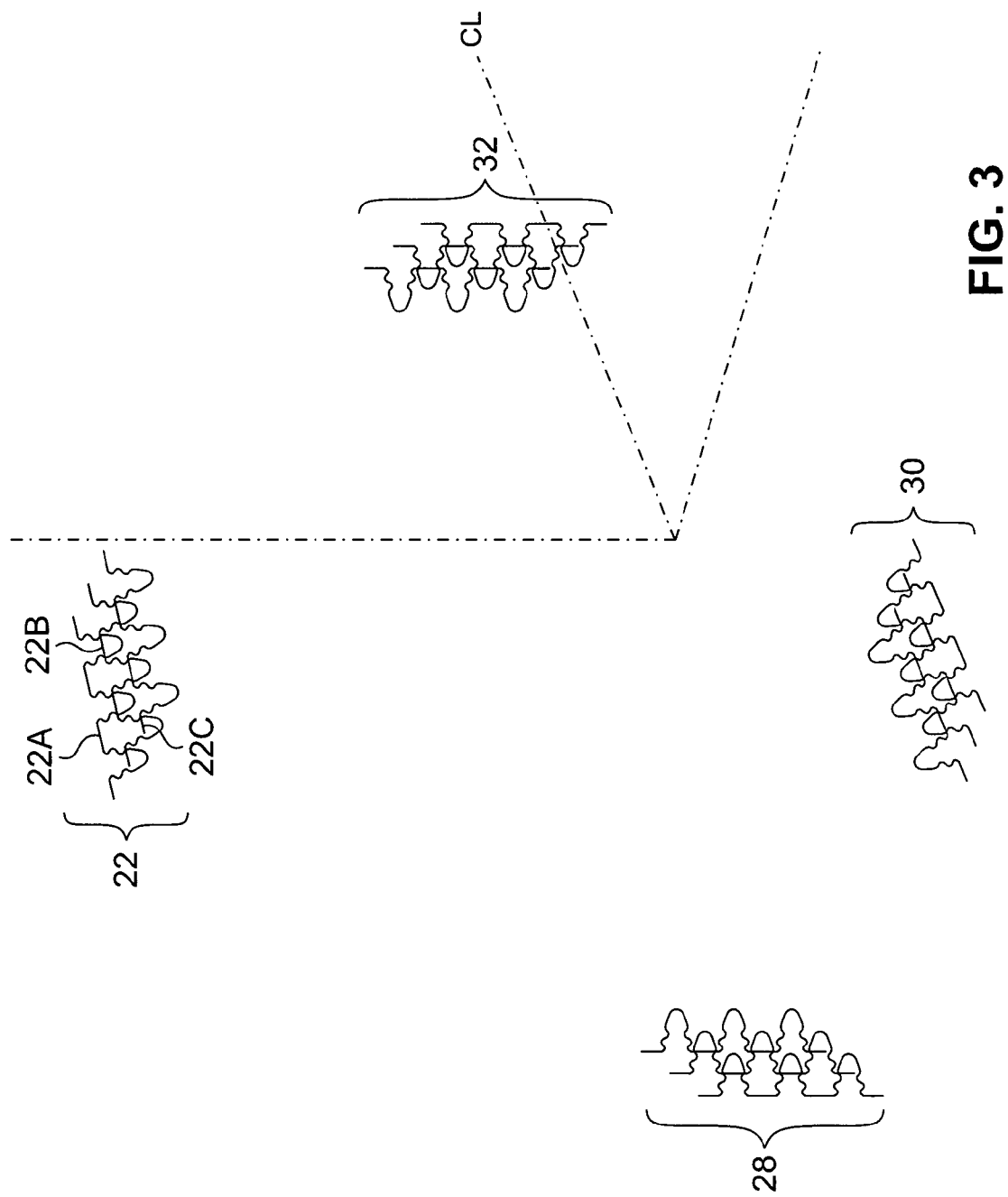
FIG. 3 is a schematic view of line scan paths for different regions of the rotor disk.

The rotor disk 20 in the illustrated embodiment has substantially axially defined slots 24 that are circumferentially spaced about its rim 26 (see FIG. 1). A representative number of those circumferentially spaced slots 24 are scanned in order to identify variations in slot geometry and to identify the true positions of the slots 24 in the rotor disk 20. FIG. 3 is a schematic view of four groups of line scan paths 22, 28, 30 and 32 for different regions of the rotor disk 20. In the illustrated embodiment, each group of line scan paths 22, 28, 30 and 32 includes scans of three adjacent slots 24, and three line scans are conducted for each slot 24 in the group 22, 28, 30 or 32 in the manner described above with respect to FIG. 2. The three line scans conducted on each scanned slot 24 are taken in the stacking plane and the first and second planes described above. In other words, the line scans for all the groups 22, 28, 30 or 32 are taken in the same three planes, such that the data for each the slots 24 is more readily comparable in later steps of the reverse engineering process. The selection of the groups 22, 28, 30 and 32 can vary. However, in a preferred embodiment the groups 22, 28, 30 and 32 are arranged at approximately 90° from each other about a centerline axis CL. Moreover, twelve or more slots 24 are typically scanned on the disk 20 (e.g., in four groups of three slots each). Additional scans can also be conducted on other regions of the disk 20 away from the rim 26. The line scans of the disk 20 generate raw coordinate data that is stored electronically.

The raw data obtained using CMM, ATOS, or other methods includes size, profile, true position, perpendicularity and centrality information in raw form.

Figure 4:
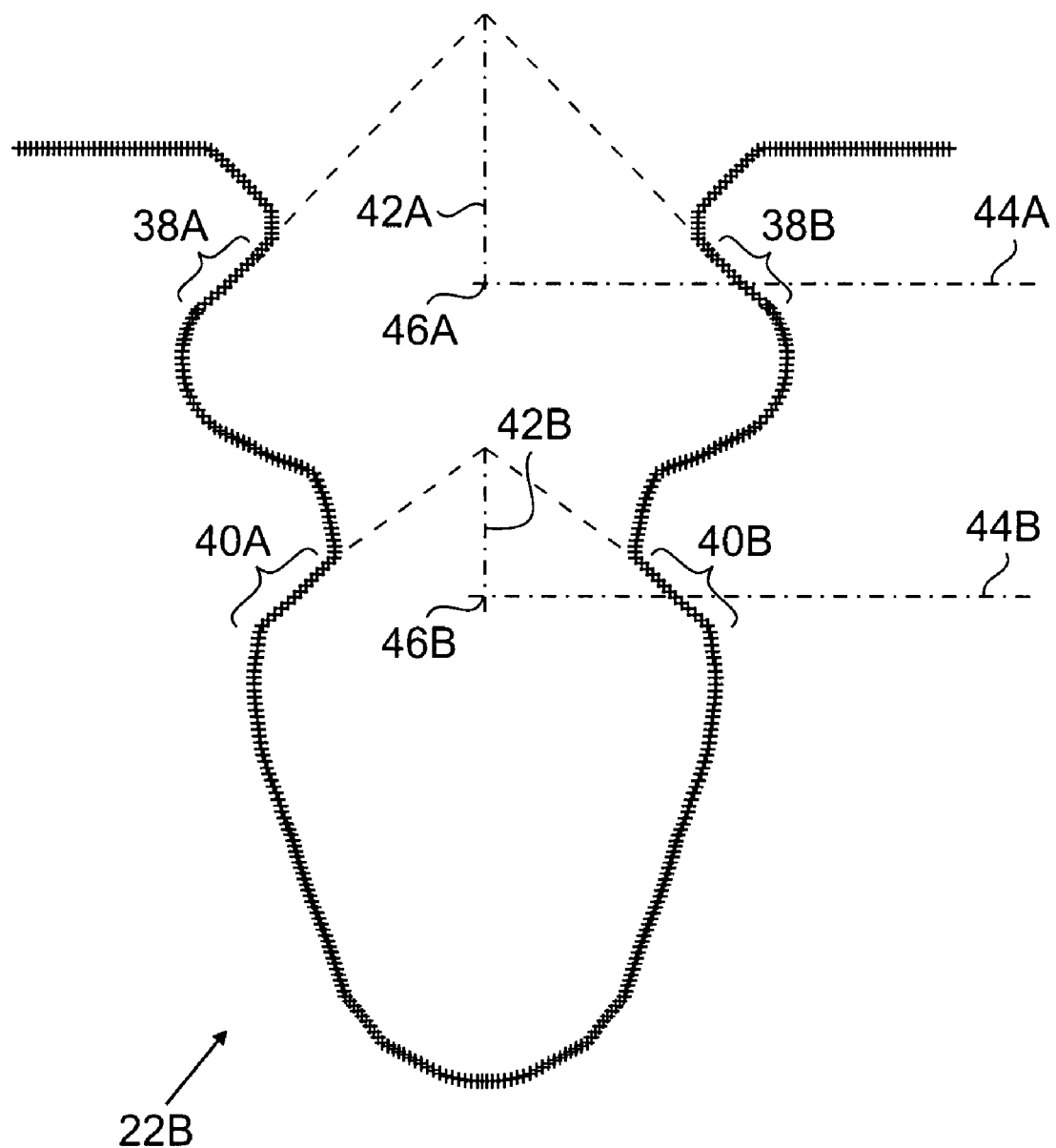
FIG. 4 is a schematic view of coordinate data for a single line scan of the rotor disk.

FIG. 4 is a schematic view of adjusted coordinate data for the line scan 22B of the slot 24 of the rotor disk 20. As shown in FIG. 4, the raw coordinate data corresponding to the pressure faces 38A, 38B, 40A and 40B has been replaced with best fit data. This is accomplished by first extracting raw coordinate data for the pressure faces 38A, 38B, 40A and 40B, and exporting the extracted raw data to a spreadsheet software application like Excel™ or other suitable software application. Best fit data is then generated as a function of the extracted raw data. Most root attachment features utilize planar pressure faces, and therefore a best fit line can be used as the best fit data. A best fit line can be determined using a conventional least squares regression line method. In alternative embodiments where a pressure face is not planar, more complex best fit curves can be mathematically determined and used as best fit data.

Next, reference features are established based on the local coordinate systems. The reference features include an axis of symmetry 42, a Z-plane 44, and a P-point 46. The axis of symmetry 42 generally extends radially with respect to the slot 24. An axis of symmetry 42 can be established by extending the best fit lines for one of the pairs of pressure faces 38A and 38B or 40A and 40B and then bisecting the included angle. As with the local coordinate systems, a separate axis of symmetry 42A and 42B can be determined for each of the pairs of upper and lower pressure faces 38A, 38B, 40A and 40B. Z-planes 44A and 44B are established relative to each pair of pressure faces 38A, 38B, 40A and 40B, and are defined perpendicular to the axis of symmetry 42 at a radial location that corresponds to a predetermined gage width. The radial location corresponding to the predetermined gage width is typically a radial midpoint of the pressure faces 38A, 38B, 40A and 40B. P-points 46A and 46B are defined at the intersection of the axis of symmetry 42A and the Z-plane 44A and the intersection of the axis of symmetry 42B and the Z-plane 44B, respectively.

The best fit procedures and the reference feature establishment procedures described above are performed for each line scan 22A-22C of the slot 24. An analysis is then performed comparing the data from each line scan 22A-22C, which allows three-dimensional geometric information to be determined that could not otherwise be deduced from line scans in any single plane. At this point, Z-plane, true position, perpendicularity, slash angle, and centrality information for the slot 24 can be determined. For instance, perpendicularity and slash angle for the slot 24 can be determined by comparing the P-points 46A and 46B for each line scan 22A-22C and establishing a line (or best-fit line) that connects the P-points 46A for each line scan 22A-22C and another that connects the P-points 46B for each line scan 22A-22C.

Figure 5:
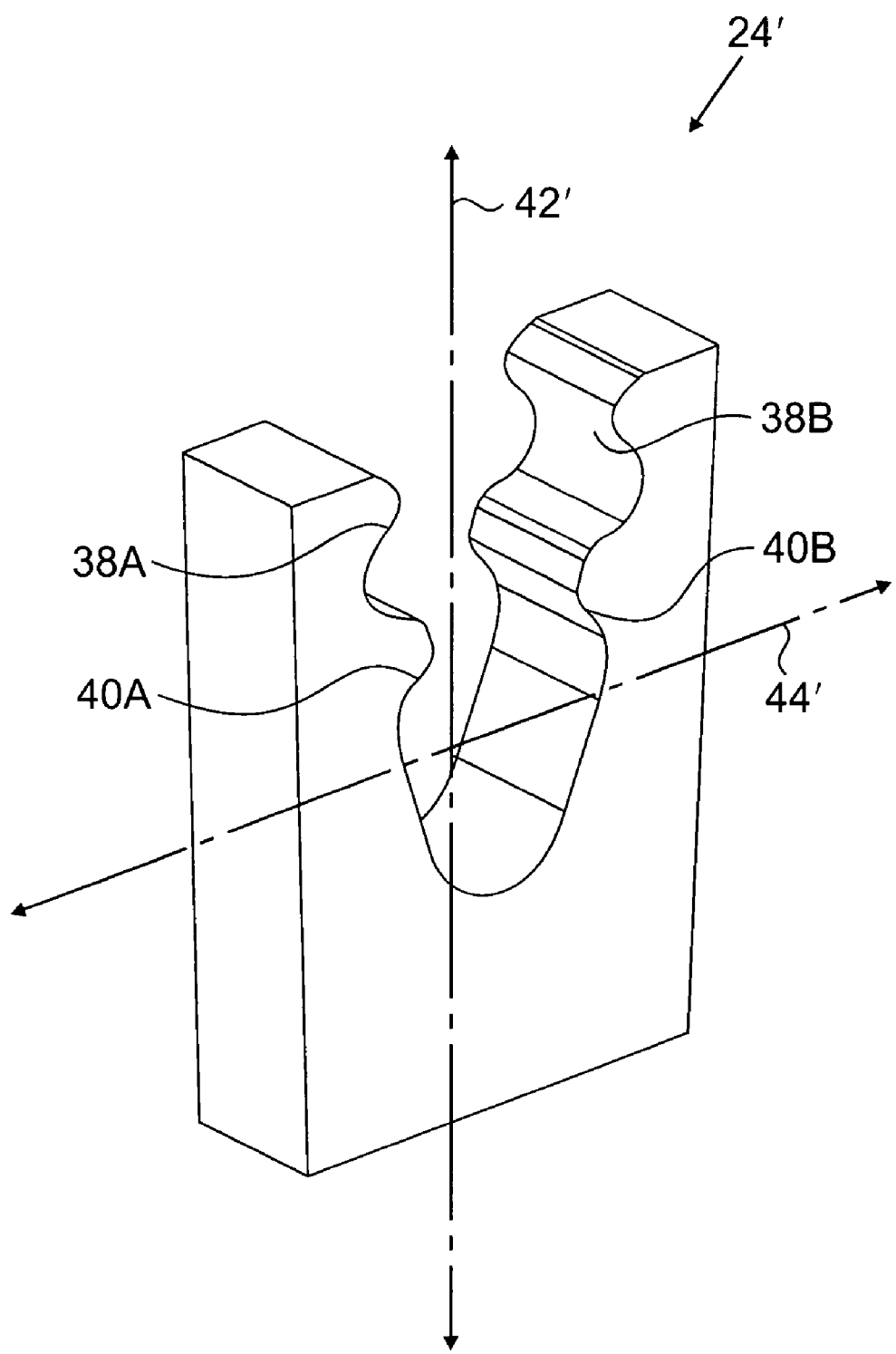
FIG. 5 is a perspective view of a solid-body model of a single slot section the rotor disk.

Once the raw coordinate data for the slot 24 has been adjusted to provide best-fit lines (or best-fit curves) for the pairs of upper and lower pressure faces 38A, 38B, 40A and 40B, the adjusted scan data (i.e., the raw coordinate data adjusted to provide best fit lines, etc.) can be aligned to a solid-body (or parasolid) computer model relative to the local coordinate systems. FIG. 5 is a perspective view of a solid-body (or parasolid) model of one slot 24' of the rotor disk 20. The solid-body model can be used to extract size and profile data for the slot 24', and can be developed by using the ATOS digital data and/or any CMM raw coordinate data in conjunction with a conventional modeling software application, such as NX™, Unigraphics™, Geomagic™, etc. Data can generally be exchanged between such software applications as necessary. Next a representative single slot 24' can be selected and extracted from the data representing the entire disk 20. A local coordinate system is then established for the single slot 24' in a datum plane, which can correspond to the stacking plane of the slot 24'. The local coordinate system includes a radial axis 42' and a tangential axis 44' defined in the datum plane. The radial axis 42' can be matched to an axis of symmetry 42A or 42B, and the tangential axis 44' can be matched to a Z-plane 44A or 44B. In the illustrated embodiment, the slot 24' represents a firtree shaped slot that corresponds to the slot 24. A pair of radially outer teeth defines the pair of upper pressure faces 38A and 38B, and a pair of radially inner teeth define the pair of lower pressure faces 40A and 40B. It is possible to define separate local coordinate systems relative to each set of teeth, which for the illustrated embodiment would include an upper local coordinate system and a lower local coordinate system.

Software programs like Geomagic™ use macros to "remember" procedures used to match coordinate data and size and profile data for a first slot, and can then automatically apply that same procedure to perform the same matching for all the other slots previously scanned. Thus, the local coordinate system for one slot can effectively be applied to all of the slots of the disk 20 in a simple and efficient manner.

After the adjusted scan data is aligned relative to the local coordinate system, an inspection is performed to ensure that the adjusted slot data is suitably accurate, reliable and error-free. This inspection can include a number of distinct symmetry checks, such as tangency, angle, fillet radii, and other symmetry checks. These symmetry checks ensure that all of the lines and curves connecting data points of the adjusted slot data align properly, and each symmetry check is generally performed relative to each line scan 22A-22C. Any non-symmetric features as assessed to determine if they are justified as a design parameter or are the result of a measurement error from the reverse engineering process. If any non-symmetries are noted that are not justified as design parameters, corrective adjustments to slot data can be made as desired.

Figure 6B:
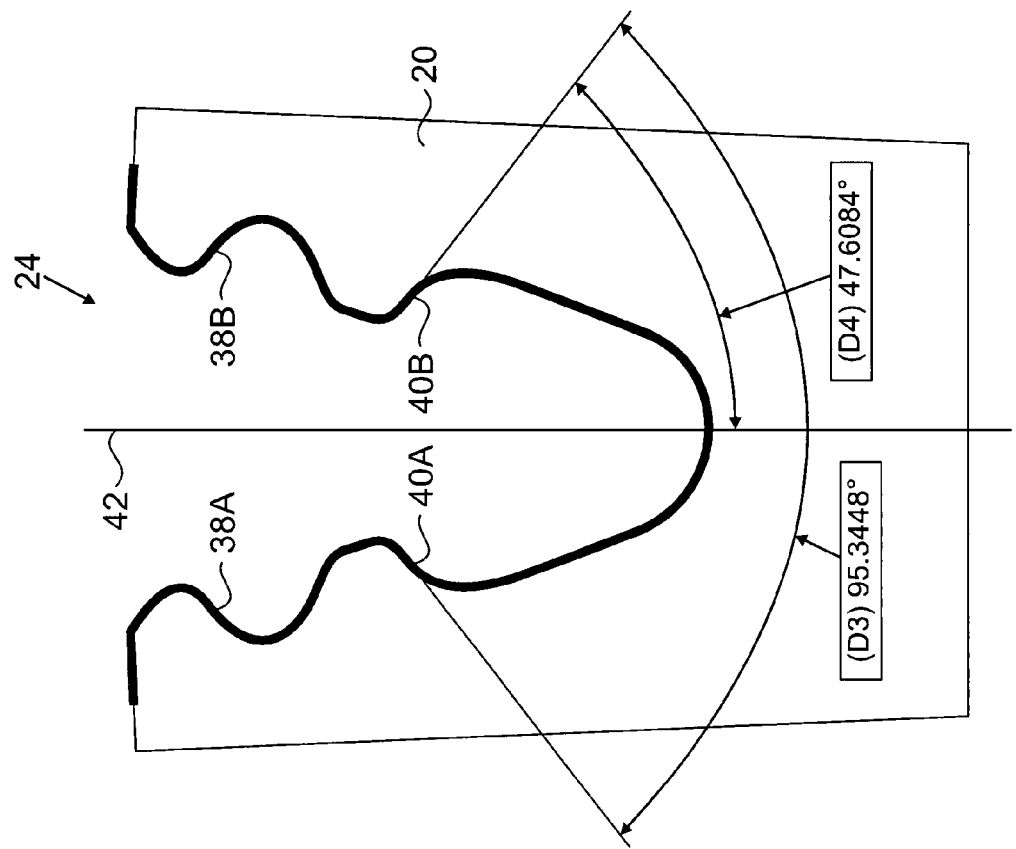
FIG. 6B is a schematic view of the single slot section of the rotor disk showing slot face angles used to perform an angle symmetry inspection.
Figure 6A:
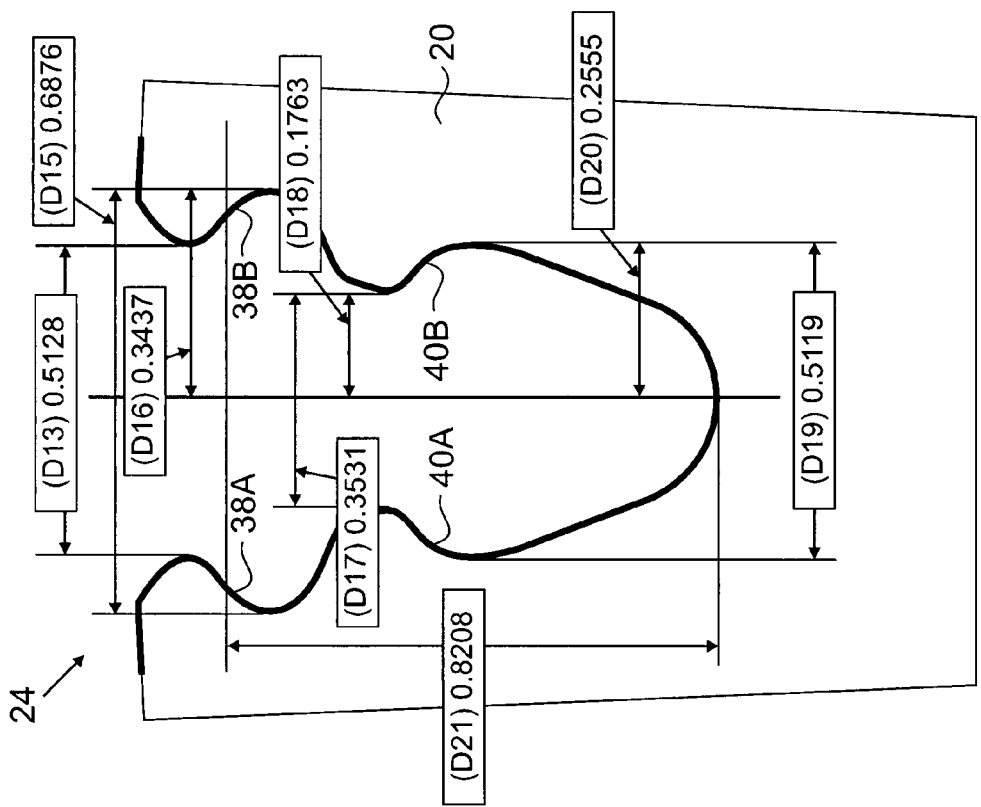
FIG. 6A is a schematic view of a single slot section of the rotor disk showing dimensions used to perform a tangency symmetry inspection.

FIG. 6A is a schematic view of the slot 24 showing dimensions used to perform a tangency symmetry inspection. The tangency symmetry inspection involves checking the alignment of the lines and curves of the slot 24. For instance, the best fit lines of the pressure faces 38A, 38B, 40A and 40B are inspected to determine if they align with adjacent surfaces, and the slot 24 is inspected to determine if it is tangent to the outer diameter rim of the disk 20.

FIG. 6B is a schematic view of the slot 24 showing slot face angles used to perform an angle symmetry inspection. The angle symmetry inspection involves measuring an included angle between corresponding pairs of pressure faces and the angle formed by a pressure face relative to the axis of symmetry 42. It is expected that for symmetrical slots, the angle formed by a pressure face relative to the axis of symmetry 42 should be exactly half of the included angle between corresponding pairs of pressure faces. As shown in FIG. 6B, the angle formed by the pressure face 40B relative to the axis of symmetry 42 is 47.6084°, which is slightly less than half of the included angle 95.3448° between the pressure faces 40A and 40B.

Figure 6D:
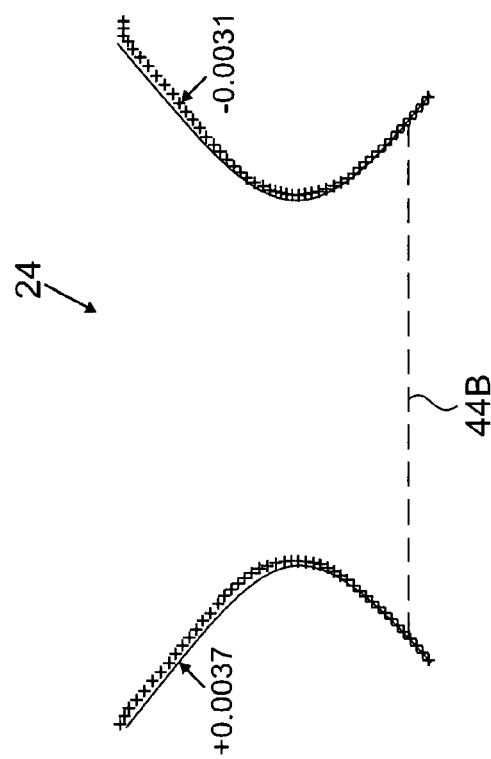
FIG. 6D is a schematic view of a portion of the single slot section superimposed over adjusted scan data relative to the local coordinate system for purposes of performing a symmetry inspection.
Figure 6C:
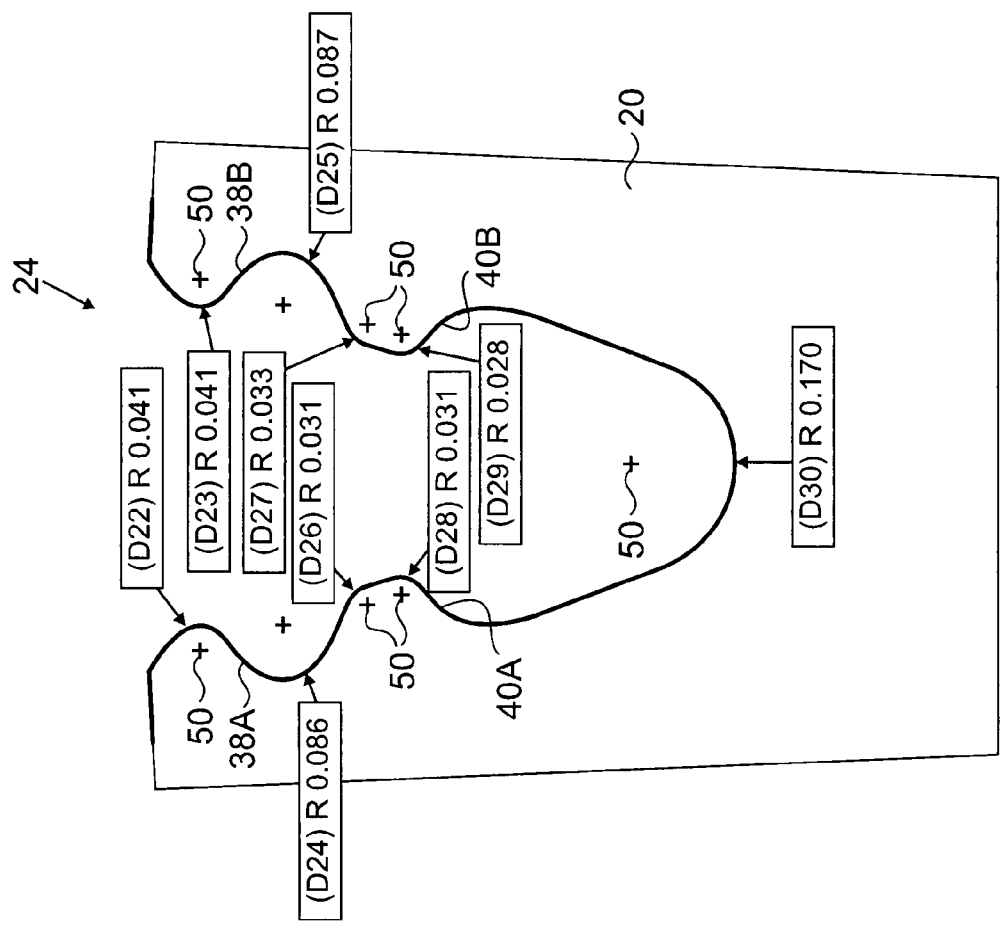
FIG. 6C is a schematic view of the single slot section showing reference points used to perform a fillet radii symmetry inspection.

FIG. 6C is a schematic view of the slot 24 showing reference points 50 used to perform a fillet radii symmetry inspection. Fillet radius reference points 50 can be derived from available data using conventional design software such as Geomagic™. The fillet radii are inspected to determine if the adjusted slot data for the pressure faces 38A, 38B, 40A, and 40B align with fillet regions without any discontinuities resulting from measurement errors.

FIG. 6D is a schematic view of a portion of the single slot section 24' superimposed over adjusted scan data of the slot 24 relative to the local coordinate system for purposes of performing a symmetry inspection. This inspection involves determining if the adjusted slot coordinate data (shown in FIG. 6D by "+" symbols) aligns with an expected slot geometry of the slot 24' of the solid body model (shown in FIG. 6D as the solid lines/curves) based upon one of the Z-plane axes 44. In FIG. 6D, the adjusted coordinate data of slot 24 is clocked (or rotated) slightly away from a desired alignment with the slot 24' of the solid body model.

Once local coordinate systems have been established for all of the slots 24 of the disk 20 and a symmetry inspection has been performed (and any necessary adjustments made based on the symmetry inspection), a master slot data set is compiled by averaging the adjusted slot data for all of the slots 24 of the disk 20. The master slot data set provides a representative data set for all of the slots 24 of the disk 20. It should be noted that for most disks, all slots generally have identical configurations, although for rotor disks having slots with different configurations more than one master data set can be established for each slot configuration.

Figure 7:
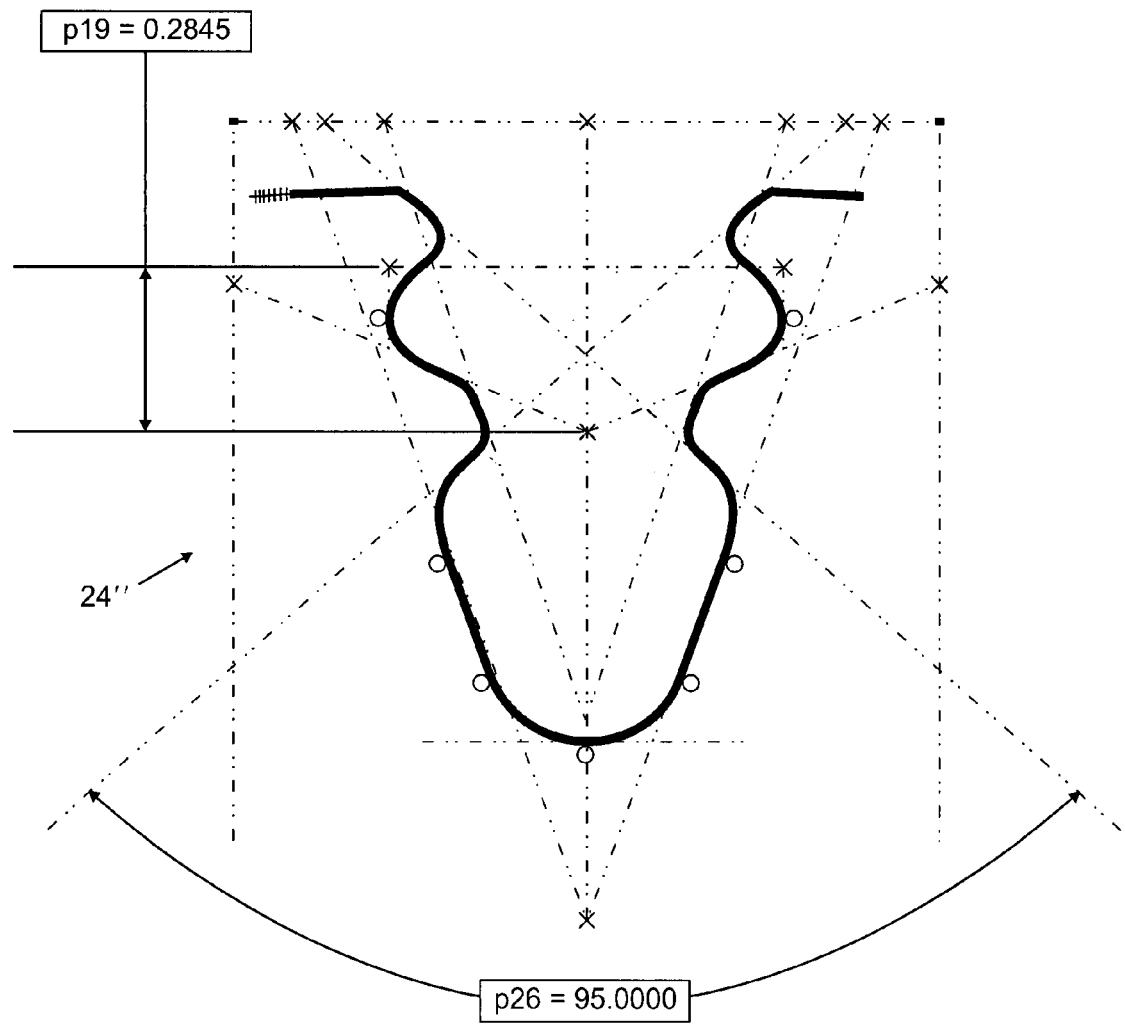
FIG. 7 is a schematic view of a nominal model for a single slot section of the rotor disk based upon all lines scans.

FIG. 7 is a schematic view of a nominal model 24" for a single slot section of the rotor disk 20 based upon all lines scans. The nominal model 24" is a parametric representation of a single slot that corresponds to the master slot data set, and includes size, profile, true position, perpendicularity, centrality and slash angle data.

Figure 8:
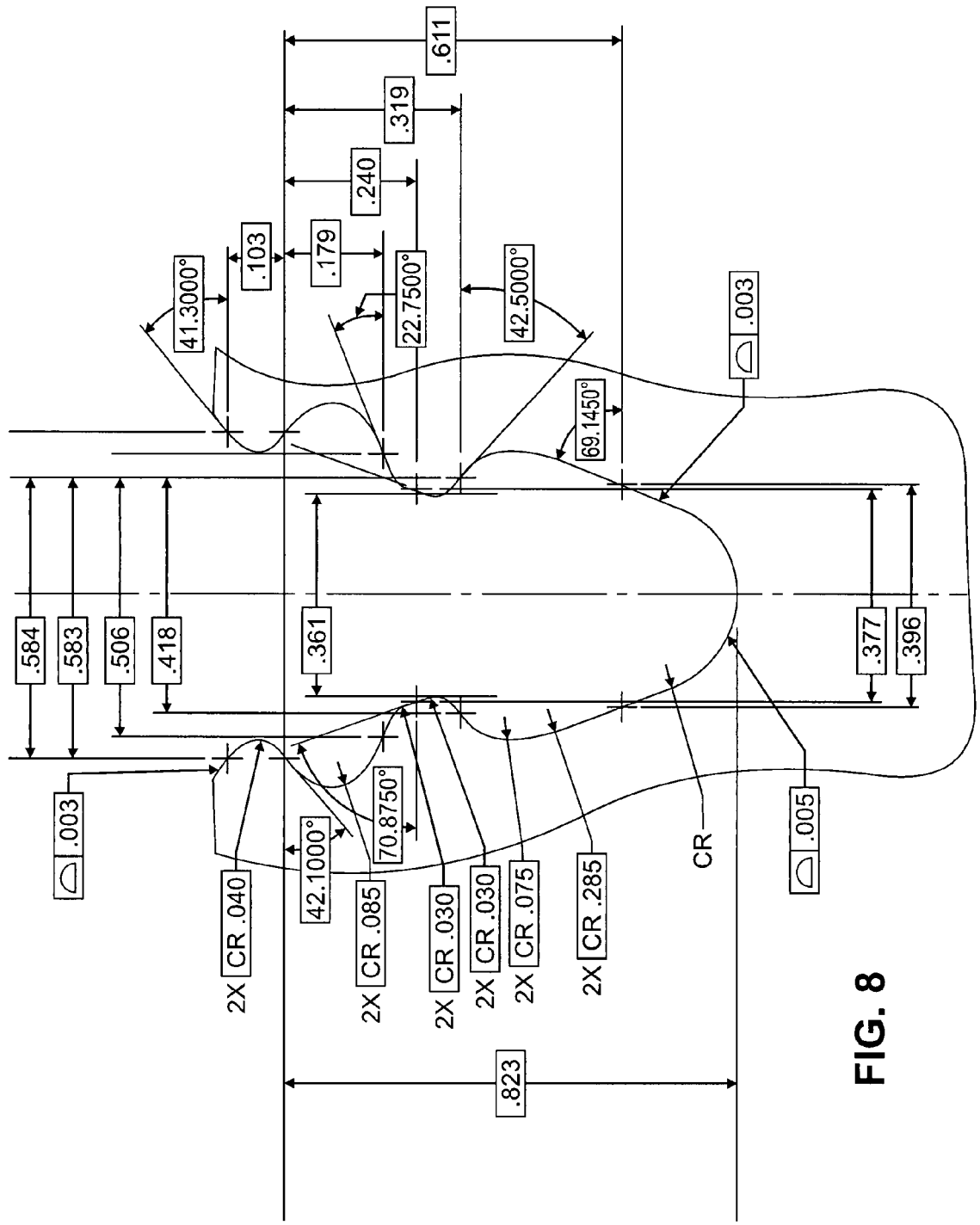
FIG. 8 is a schematic view of a master slot blueprint for the rotor disk.

The nominal model is then converted into a master slot blueprint for the rotor disk 20, which represents the manufacturing specifications for newly manufactured components based upon the reverse engineering process of the present invention. FIG. 8 is a schematic view of the master slot blueprint for the rotor disk 20, which is a single blueprint representative of all of the slots of the disk 20. The master slot blueprint can be combined with blueprints for other regions of the disk 20 to provide a complete specification for manufacturing new components.

Figure 9:
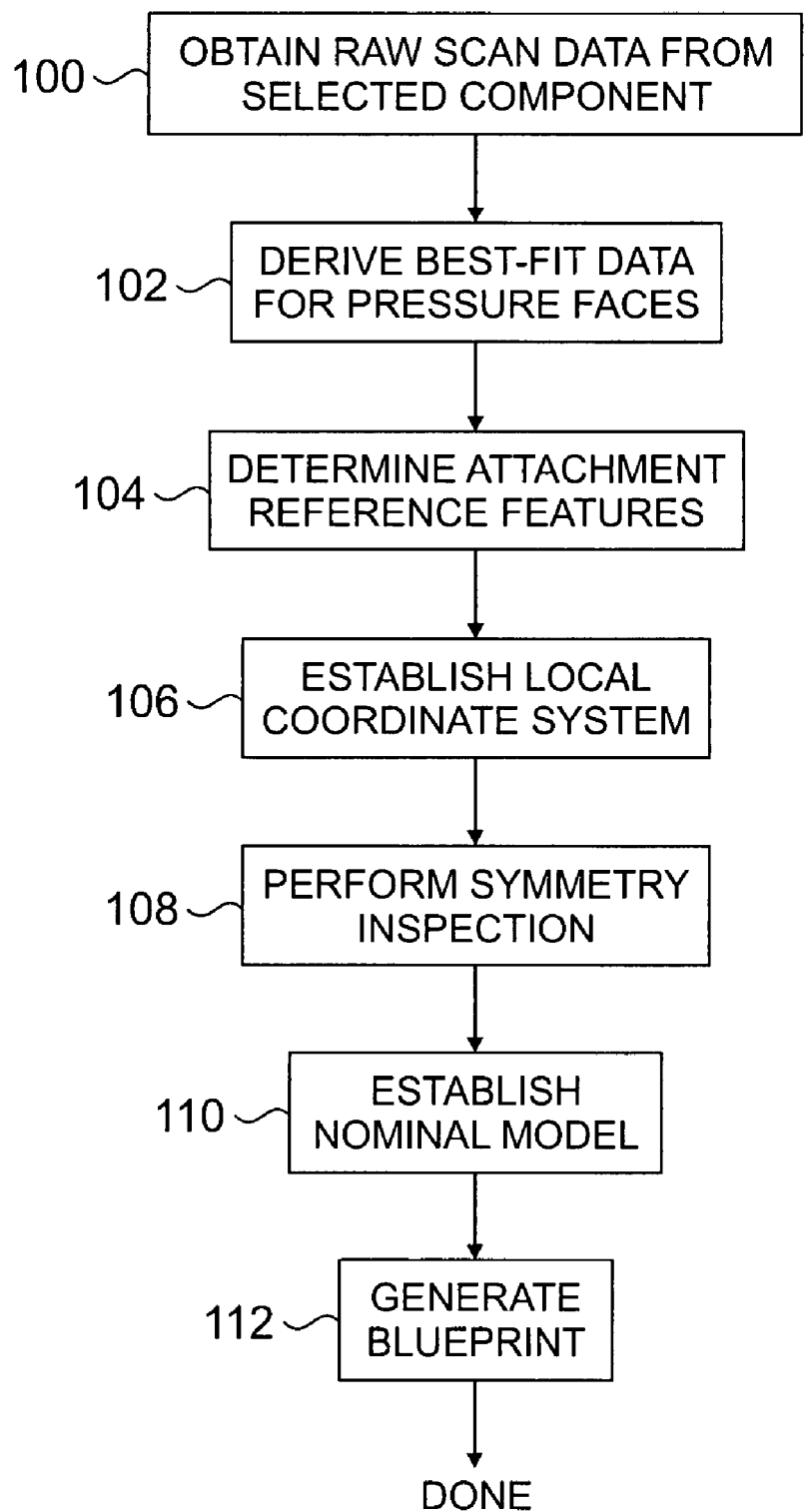
FIG. 9 is a flow chart summarizing the reverse engineering process.

FIG. 9 is a flow chart summarizing the reverse engineering process. First, raw scan data is obtained from a selected component (step 100). Best-fit data is then derived for pressure face surfaces of the root attachment feature (step 102). Then attachment reference features (e.g., an axis of symmetry, Z-plane, etc.) are determined (step 104) and a local coordinate system is established (step 106). Next, a symmetry inspection is performed using desired symmetry checks (step 108). A nominal root attachment feature model is then established based upon all available data (step 110) and a blueprint specification is generated (step 112).

Although the present invention has been described with reference to preferred embodiments, workers skilled in the art will recognize that changes can be made in form and detail without departing from the spirit and scope of the invention. For instance, while the method of the present invention is described with respect to turbine rotor disks, it will be understood that the method applies to other types of components as well, such as turbine blades. Moreover, it is contemplated that the blueprint specification generated by the reverse engineering process can be modified as desired in order to produce newly manufactured components that differ in some way from the existing component reverse engineered.

What is claimed is:

1. A method of reverse engineering a component of a gas turbine engine having a root attachment feature, the method comprising:

scanning the root attachment feature a plurality of times to obtain raw scan data from different locations on the root attachment feature in relation to a local coordinate system for the root attachment feature;

creating a best fit line relative to pressure faces of the root attachment feature as a function of the raw scan data from each scan of the root attachment feature;
determining a pressure face angle as a function of the relationship between the best fit lines of the pressure faces;
bisecting the pressure face angle to determine a symmetry plane for the root attachment feature;
establishing a master attachment data set in relation to the local coordinate system by averaging the best fit lines and the raw scan data for each scan of the root attachment feature; and
verifying symmetry of the master attachment data set.

2. The method of claim 1 and further comprising:
establishing reference points for each scan of the root attachment feature based on the best fit lines, the plane of symmetry, and a Z-plane line that is perpendicular to the plane of symmetry at a radial location determined at a selected gage width; and
comparing the reference points for each scan of the root attachment feature in order to determine perpendicularity of the root attachment feature.

3. The method of claim 2 and further comprising:
comparing the reference points for each scan of the root attachment feature in order to determine slash angle of the root attachment feature.

4. The method of claim 1, wherein a coordinate measuring machine is utilized to scan the root attachment feature a plurality of times.

5. The method of claim 1, wherein an advanced topographical optical scan system is utilized to scan the root attachment feature a plurality of times.

6. The method of claim 5 and further comprising:
generating a solid body representation of the root attachment feature as a function of output of the advanced topographical optical scan system.

7. The method of claim 6 and further comprising:
correlating coordinate data obtained using a coordinate measuring machine with the solid body representation of the root attachment feature.

8. The method of claim 5, wherein information from multiple scans is stitched together to produce raw scan data.

9. The method of claim 1 and further comprising:
generating a blueprint as a function of the master attachment data set.

10. The method of claim 1, wherein the component of the gas turbine engine comprises a disk having a plurality of blade retention slots, and wherein the master attachment data set comprises normalized data derived from at least two of the plurality of blade retention slots.

11. The method of claim 1, wherein the master attachment data set comprises size, profile, true position, perpendicularity, centrality and slash angle data.

12. The method of claim 1, wherein scanning the root attachment feature a plurality of times is conducted through at least three parallel scanning planes that are spaced from each other in an axial direction relative to an engine centerline axis.

13. The method of claim 12, wherein one of the scanning planes is a stacking plane of the root attachment feature.

14. A method of reverse engineering a component of a gas turbine engine having a root attachment feature, the method comprising:
scanning the root attachment feature using a coordinate measuring machine at least three times along scanning lines defined in parallel scanning planes;
generating raw scan data points from each scan of the root attachment feature;
establishing a local coordinate system for the root attachment feature;
creating a best fit line relative to pressure faces of the root attachment feature as a function of the raw scan data points from each scan of the root attachment feature;
determining a pressure face angle as a function of the relationship between the best fit lines of the pressure faces;
bisecting the pressure face angle to determine a symmetry plane for the root attachment feature;
establishing reference points for each scan of the root attachment feature based on the best fit lines, the plane of symmetry, and a Z-plane line that is perpendicular to the plane of symmetry at a radial location determined at a selected gage width;
establishing a master attachment data set in relation to the local coordinate system by averaging the best fit lines and the raw scan data points for each scan of the root attachment feature; and
generating a blueprint as a function of the master attachment data set.

15. The method of claim 14 and further comprising:
generating a solid body representation of the root attachment feature as a function of images of the root attachment feature generated by an advanced topographical optical scan system.

16. The method of claim 15 and further comprising:
correlating coordinate data obtained using a coordinate measuring machine with the solid body representation of the root attachment feature.

17. The method of claim 14, wherein the component of the gas turbine engine comprises a disk having a plurality of blade retention slots, and wherein the master attachment data set comprises normalized data derived from at least two of the plurality of blade retention slots.

18. The method of claim 14, wherein the master attachment data set comprises size, profile, true position, perpendicularity, centrality and slash angle data.

19. The method of claim 14, wherein scanning the root attachment feature is conducted through at least three parallel scanning planes that are spaced from each other in an axial direction relative to an engine centerline axis.

20. A method of reverse engineering a rotor disk for a gas turbine engine, the method comprising:
scanning a plurality of attachment slots at a rim of the rotor disk;
generating geometry data for each of the attachment slots scanned;
calculating a best fit line for each pressure face of the attachment slots scanned;
determining a pressure face angle as a function of the relationship between the best fit lines of the pressure faces for each of the attachment slots scanned;
bisecting the pressure face angles of each of the attachment slots scanned to determine a symmetry plane for each attachment slot scanned;
incorporating the best fit lines and the symmetry plane into the geometry data for each of the attachment slots scanned;
normalizing the geometry data for all of the attachment slots scanned; and
generating a single representative attachment slot blueprint as a function of the normalized geometry data.

21. The method of claim 20 wherein the step of scanning a plurality of attachment slots at a rim of the rotor disk comprises conducting multiple line scans in different planes with a coordinate measuring machine on each of the attachment slots scanned, and wherein the geometry data for each of the attachment slots scanned is generated as function of the multiple line scans conducted on each of the attachment slots scanned.

* * * * *